(12) United States Patent
Howard

(10) Patent No.: US 10,225,683 B1
(45) Date of Patent: Mar. 5, 2019

(54) SYSTEMS, METHODS, AND MEDIUMS FOR RECEIVING REMINDERS AND/OR IDENTIFYING AVAILABLE GOODS AND/OR SERVICES

(75) Inventor: Michael L. Howard, Renton, WA (US)

(73) Assignee: INTELLECTUAL VENTURES FUND 79 LLC, Las Vegas, NV (US)

( * ) Notice: Subject to any disclaimer, the term of this patent is extended or adjusted under 35 U.S.C. 154(b) by 1170 days.

(21) Appl. No.: 12/848,849

(22) Filed: Aug. 2, 2010

(51) Int. Cl.
*H04W 4/02* (2018.01)
*H04W 4/021* (2018.01)

(52) U.S. Cl.
CPC ..................... *H04W 4/02* (2013.01)

(58) Field of Classification Search
USPC .... 701/1, 117, 400, 408–410, 425–426, 431, 701/438
See application file for complete search history.

(56) References Cited

U.S. PATENT DOCUMENTS

| | | | | |
|---|---|---|---|---|
| 6,128,571 | A * | 10/2000 | Ito et al. | 701/426 |
| 6,564,143 | B1 * | 5/2003 | Alewine et al. | 701/438 |
| 6,601,073 | B1 * | 7/2003 | Robare | 340/995.1 |
| 6,631,321 | B1 * | 10/2003 | Ciprian | 701/469 |
| 2001/0029410 | A1 * | 10/2001 | Obradovich | 701/1 |
| 2002/0034292 | A1 * | 3/2002 | Tuoriniemi et al. | 379/219 |
| 2002/0120370 | A1 * | 8/2002 | Parupudi et al. | 701/1 |
| 2002/0138196 | A1 * | 9/2002 | Polidi et al. | 701/208 |
| 2002/0152264 | A1 * | 10/2002 | Yamasaki | 709/203 |
| 2003/0195819 | A1 * | 10/2003 | Chen et al. | 705/26 |
| 2003/0217160 | A1 * | 11/2003 | Gayama et al. | 709/228 |
| 2004/0204829 | A1 * | 10/2004 | Endo et al. | 701/202 |
| 2006/0229802 | A1 * | 10/2006 | Vertelney et al. | 701/200 |
| 2008/0080682 | A1 * | 4/2008 | Ogunwale et al. | 379/93.17 |
| 2008/0125103 | A1 * | 5/2008 | Mock | 455/418 |
| 2008/0248815 | A1 * | 10/2008 | Busch | 455/456.5 |
| 2009/0006418 | A1 * | 1/2009 | O'Malley | 707/10 |
| 2009/0157289 | A1 * | 6/2009 | Graessley | 701/123 |
| 2009/0164110 | A1 * | 6/2009 | Basir | 701/117 |
| 2009/0318168 | A1 * | 12/2009 | Khosravy et al. | 455/456.3 |

OTHER PUBLICATIONS http://www.reqall.com/about/remember_here_and_now.

* cited by examiner

*Primary Examiner* — Mussa A Shaawat
*Assistant Examiner* — Kyung J Kim
(74) *Attorney, Agent, or Firm* — Schwabe, Williamson & Wyatt

(57) ABSTRACT

Examples are generally described that include methods and systems for providing a reminder and/or identifying availability of a good or service, or both. In many examples, a reminder may be provided when a computing device satisfies one or more criteria associated with a reminder request. For instance, a reminder may be provided when the location associated with a computing device is proximate a destination and when the direction of travel associated with a computing device indicates that the proximity of the computing device is increasing or decreasing relative to a predetermined location. In other examples, a computing device may be utilized to identify an entity that associated with a requested good or a requested service, or both. In some examples, a location associated with the computing device may be determined and servers associated with an entity within a range of the location may be searched to identify the request good or the requested service, or both.

16 Claims, 9 Drawing Sheets

SYSTEMS, METHODS, AND MEDIUMS FOR RECEIVING REMINDERS AND/OR IDENTIFYING AVAILABLE GOODS AND/OR SERVICES

BACKGROUND

Unless otherwise indicated herein, the materials described in this section are not admitted to be prior art to the claims by inclusion in this section.

Sometimes it is difficult for one to remember to complete a task at a convenient time for completing the task. For example, when one is near a grocery store and needs to purchase milk, one may forget to stop at the grocery store and purchase milk, or when one is on their way home from work and approaching their dry cleaner, one may forget that they wish to pick up their dry cleaned clothes. In some cases, one may remember to complete a task, but may not be aware of where to go to in order to complete the task, e.g., may not be aware of where to go to purchase a desired good or service. This may be particularly frustrating when one is out shopping and the stores visited do not have the desired good or service.

BRIEF DESCRIPTION OF THE DRAWINGS

The foregoing and other features of the present disclosure will become more fully apparent from the following description and appended claims, taken in conjunction with the accompanying drawings. Understanding that these drawings merely depict several examples in accordance with the disclosure, and therefore, are not to be considered limiting of its scope; the disclosure will be described with additional specificity and detail through use of the accompanying drawings.

SUMMARY

Figure 1:
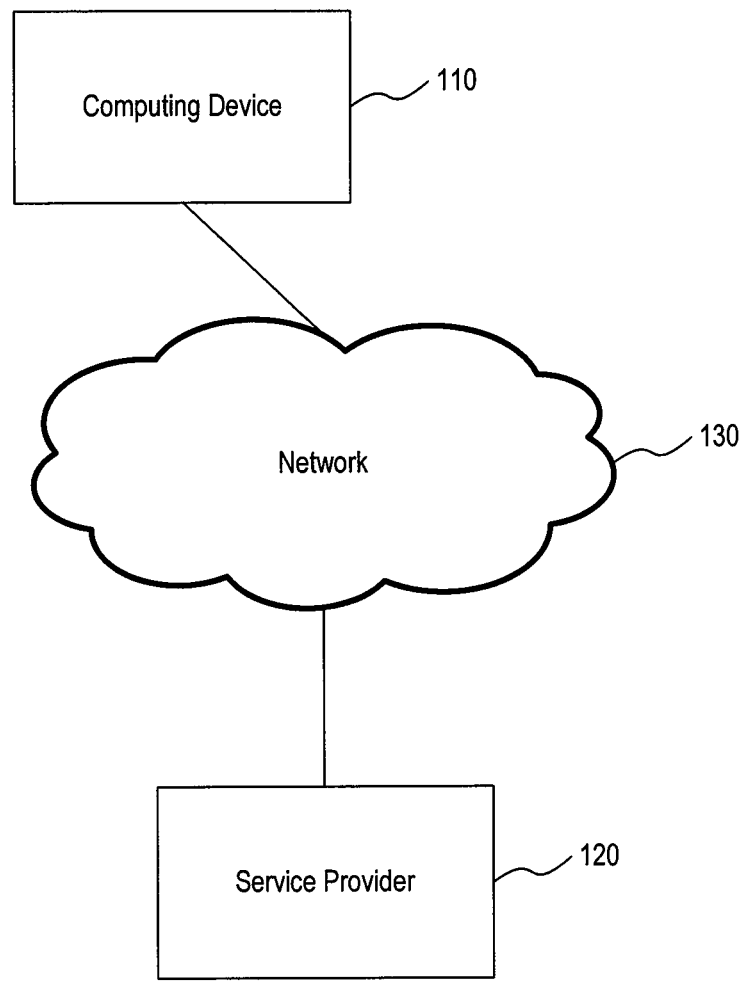
FIG. 1 illustrates a system for providing a reminder, such as a reminder message, in accordance with at least some examples of the present disclosure.

The present disclosure describes methods and systems for providing a reminder, such as a reminder message. An exemplary method may include receiving a first location associated with a computing device and a direction of travel associated with the computing device. The method also may include comparing the location associated with the computing device to a first criteria associated with a reminder request and comparing the direction of travel associated with the computing device to a second criteria associated with the reminder request. In some examples, the first criteria may comprise the location associated with the computing device being proximate a destination, and the second criteria may comprise the direction of travel associated with the computing device indicating that the proximity of the computing device to the destination is increasing. The method also may include providing a reminder associated with the reminder request in response to satisfaction of each criteria associated the reminder request, such as the first criteria and the second criteria.

The present disclosure further describes methods and systems for identifying availability of a good or a service, or both. An exemplary method may include receiving a request for the good or the service, or both, from a computing device. The method further may include receiving a location associated with the computing device. The request for the good or the service, or both, may be provided to at least one server associated with an entity that is located within a particular range of the location associated with the computing device. The method further may include receiving a first message from at least one of the at least one server indicating availability of the requested good or the requested service, or both. A second message indicating the availability of the requested good or service may be provided, such as to the computing device.

Another exemplary method may include receiving a request for a good or a service, or both from a computing device. The method further may include selecting an available good or an available service, or both that correlates to the requested good or the requested service, or both. A message may be provided to the computing device indicating the selected available goods or the selected available services, or both, and identifying an entity associated with the available goods or the available services, or both.

An exemplary system may include a receiver, a comparator, and a transmitter. The receiver may be configured to receive a request for a good or a service, or both, from a computing device. The comparator may be configured to compare the requested good or the requested service, or both, to one or more available goods or available services, or both, and to determine whether there is a correlation between the requested goods or the requested services, or both. The transmitter may be configured to provide, in response to the determination that there is a correlation, a message indicating the correlation and identifying at least one entity associated with the correlation.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, devices, computer-readable mediums, and/or apparatus generally related to receiving reminders, such as reminder messages, and identifying available goods and/or services. Some exemplary methods, systems, devices, computer-readable mediums, and/or apparatus may provide a reminder, such as a reminder message, which indicates an availability of a good or a service, or both. In some examples, a reminder may be provided when an attribute, e.g., a location or a direction of travel, or both, associated with a computing device satisfies one or more criteria associated with a reminder request. For instance, a reminder may be provided when the computing device is traveling, e.g., within a moving vehicle, in a particular direction relative to a particular, e.g., predetermined, location and/or is proximate to, e.g., within a predetermined distance of, the particular location. Other exemplary methods, systems devices, computer-readable mediums, and/or apparatus may include identifying an entity associated with a requested good or a requested service, or both. In some examples, a location associated with a computing device requesting the good or the service, or both, may be determined and a server associated with an entity within a range of the location may be searched to identify the requested good or the requested service, or both.

Reminders accordingly may be provided when an attribute associated with a computing device satisfies one or more criteria associated with a reminder request. Any of a variety of attributes may be used, including a location or a direction of travel, or both. Moreover, those of ordinary skill in the art readily will understand that the phrase: "direction of travel associated with a computing device," as used herein, broadly may include a current direction of travel associated with the computing device and/or an anticipated/expected direction of travel, e.g., an anticipated/expected path of travel, associated with the computing device. Those of ordinary skill in the art also readily will understand that the phrase: "location associated with a computing device" broadly may include a current location of the computing device and/or an anticipated/expected future location of the computing device, e.g., a location anticipated/expected based on the anticipated/expected path of travel associated with the computing device. For example, an anticipated or an expected path of travel associated with the computing device may be used to trigger a reminder. The path of travel may, in some examples, be anticipated or expected based on a destination input into a navigation system. In other examples, the path of travel may be anticipated or expected based on past behavior and one or more measured positions or directions. For example, a computing device may identify an expected path of travel from communication with a navigation system or with a device-resident navigation application. The computing device may implement a heuristic that may combine any combination of the current location, the current time, and past travel history. In one example, a phone with a GPS unit may have data related to a path taken on prior trips, e.g., prior trips to work. If the day is a weekday and the time is the morning, an application on the phone may deduce an expected path based on the prior trips to work. In another example, if during prior travel a vehicle associated with the computing device generally or always exits a particular route, e.g., route 405, via a first exit after entering the particular route via a second exit, the application may deduce that the vehicle associated with the computing device likely will exit the particular route via the first exit after the computing device receives an indication that the vehicle entered the particular route via the second exit.

FIG. 1 illustrates a system 100 for providing a reminder, such as a reminder message, in accordance with at least some examples of the present disclosure. System 100 may include a computing device 110 coupled to a service provider 120 via a network 130. Computing device 110 may be any type of mobile computing device, such as a laptop computer, a wireless phone, a global positioning system, or any other device capable of transmitting signals to a network.

Network 130 may be any environment configured to receive and to transmit signals. In some examples, the network may be a wide area network (WAN), a local area network (LAN), a campus area network (CAN), a metropolitan area network (MET), a personal area network (PAN), or the like.

Computing device 110 may be configured to allow a user to generate one or more reminder requests. A reminder request may include or correspond to a reminder, such as a reminder message. The reminder may remind a user of something, such as a task to complete. A reminder request may include one or more criteria that, when satisfied, trigger the reminder to be provided to computing device 110. In some examples, the one or more criteria may include a class of stores, such as a drugstore or a grocery store, a class of goods, such as books, or a class of services, such as dry cleaning or car washing, or any combination thereof. The one or more criteria also may include a trademark, a good brand name, a store brand name, or a service brand name, or any combination thereof. In some examples, the one or more criteria may include one or more particular, e.g., predetermined, destinations or locations. In some examples, the reminder request may include a criteria that computing device 110 be within a predetermined distance of a first location to trigger the reminder to be provided to computing device 110. The one or more criteria also may include criteria associated with a direction of travel associated with computing device 110, such as the direction of travel associated with computing device 110 indicating that the proximity of computing device 110 to the first location and/or second location, such as a user's home or office, is increasing. In some examples, the one or more criteria further may include a time of day, such as after work or during daylight hours. Other time-related criteria may include a calendar event, such as payday, wife's birthday, every second Tuesday, etc. Criteria may include factors other than location or destination information in some examples. For example, a criteria may be when the computing device is connected to a network having a predetermined speed or cost. In one example, a reminder may be provided, for example, to download an audio or video file when the computing device is connected to a free network or network having below a predetermined cost threshold per bit.

The reminder may be a visual reminder and/or an audio reminder, and may include a task to be completed. In some examples, the reminder may include information indicating how the one or more criteria of the reminder request were satisfied and/or directions to the particular location associated with the satisfaction of the one or more criteria. For instance, if a reminder request includes criteria associated with computing device 110 being within a predetermined number of blocks, e.g., two blocks, of a particular class of stores, e.g., grocery stores, and a direction of travel associated with computing device 110 corresponding to a direction of travel indicating that computing device 110 is moving closer to the particular class of stores, the reminder may provide directions to the grocery store and remind the user to purchase a particular item, such as milk.

Computing device 110, network 130, or service provider 120, or any combination thereof, may be configured to determine a location and/or a direction of travel associated with computing device 110, such as an approximate location of computing device 110 or a range in which computing device 110 is located. For instance, computing device 110 may be configured to determine a location and/or a direction of travel associated with computing device 110 via a positioning means, such as a global positioning system (GPS). In other examples, service provider 120, computing device 110 and/or network 130, in combination or by themselves, may be configured to determine a location and/or a direction of travel associated with computing device 110 using cell tower signal strength and/or a cell tower triangulation. In particular, distance to a cell tower may be determined by signal strength to one or more cell towers to associate computing device 110 with a location. As signal strength to one or more towers increases or decreases, a direction of travel may be identified. In one example, network 130 may provide signal strength information and a cell tower location to service provider 120, and service provider 120 may analyze the information to determine a location and/or a direction of travel associated with computing device 110. In one example, network 130, service provider 120, or computing device 110, or any combination thereof, may be configured to detect a speed associated with the movement of computing device 110 using locations associated with computing device 110 over time. In some examples, the presence of a signal itself may provide location information. For example, an SSID received from a known local area network, such as a home or office network, may itself provide location information (e.g., home or work location).

In one example, computing device 110 may be configured to generate and to store reminder requests and to trigger at least one reminder request when at least one attribute associated with computing device 110 satisfies one or more criteria associated with the reminder request. In some examples, computing device 110 may comprise software configured to compare the location and/or the direction of travel associated with computing device 110 to the one or more criteria associated with the one or more reminder requests. In this example, computing device 110 may be coupled to network 130, but may not be coupled to service provider 120 via network 130. Computing device 110 may be configured to determine whether at least one attribute associated with computing device 110 satisfies one or more criteria associated with the reminder request. For example, computing device 110 may be configured to compare a location associated with computing device 110 with a first criteria associated with a first reminder request to determine whether the first criteria is satisfied. The first criteria may be satisfied when computing device 110 is proximate a predetermined destination, e.g., within a predetermined distance of the predetermined destination, such as a particular store. The term: "within" is one example of a logical qualifier that may be evaluated by the computing device 110. Other logical qualifiers may include NOT, OR, AND, or any combination thereof. For example, one criteria may be that it is not Saturday. Another criteria may be based on proximity to a first store or a second store. Yet another criteria may be when it is in the afternoon and it is cloudy. Computing device 110 may be configured to compare a direction of travel associated with computing device 110 with a second criteria associated with the first reminder request to determine whether the second criteria is satisfied. The second criteria may be satisfied when the direction of travel associated with computing device 110 indicates that the proximity of computing device 110 to the predetermined destination is increasing. In response to each of the one or more criteria being satisfied, computing device further may be configured to provide a reminder, e.g., a reminder message, associated with the reminder request. In one example, computing device 110 may be configured to generate the reminder and to provide the reminder to an output of computing device 110. In other examples, computing device 110 may be configured to provide the reminder to another computing device.

In another example, service provider 120 may be configured to receive and to store reminder requests and to trigger at least one reminder request when at least one attribute associated with computing device 110 satisfies one or more criteria associated with the reminder request. Service provider 120 may be configured to receive, via network 130, the one or more reminder requests from computing device 110. When at least one attribute associated with computing device 110 satisfies at least one or all criteria associated with the reminder request, service provider 120 may be configured to provide the reminder corresponding to the reminder request to computing device 110 or to cause a reminder stored on computing device 110 to be provided to an output of computing device 110.

In an another example, service provider 120 or computing device 110 may be configured to send a corresponding reminder to a second computing device (not shown) when an attribute associated with computing device 110 satisfies the one or more criteria associated with a reminder request. The reminder may be sent to the second computing device without a reminder being sent to computing device 110. In another example, the reminder sent to the second computing device may be the same reminder sent to an output of computing device 110 or may be a different reminder. For instance, if a first user of computing device 110 is near a grocery store and receives a first reminder including directions to the grocery store and a message reminding the user to pick up milk, a second user of a second computing device may receive a second reminder indicating that computing device 110 is near the grocery store.

Computing device 110 may be configured to prevent the generation of reminders even when attributes associated with computing device 110 satisfy each criteria associated with a reminder request. For example, computing device 110 may comprise a feature that allows a user to prevent the triggering of a first reminder but allow the triggering of a second reminder even though computing device 110 satisfies each criteria associated with both the first and second reminders. In some examples, when computing device 110 is traveling at a relatively constant speed, such as when on a plane or a train, computing device 110 may be configured to prevent the generation of a reminder even when attributes associated with computing device 110 satisfies each criteria associated with the reminder.

Figure 2:
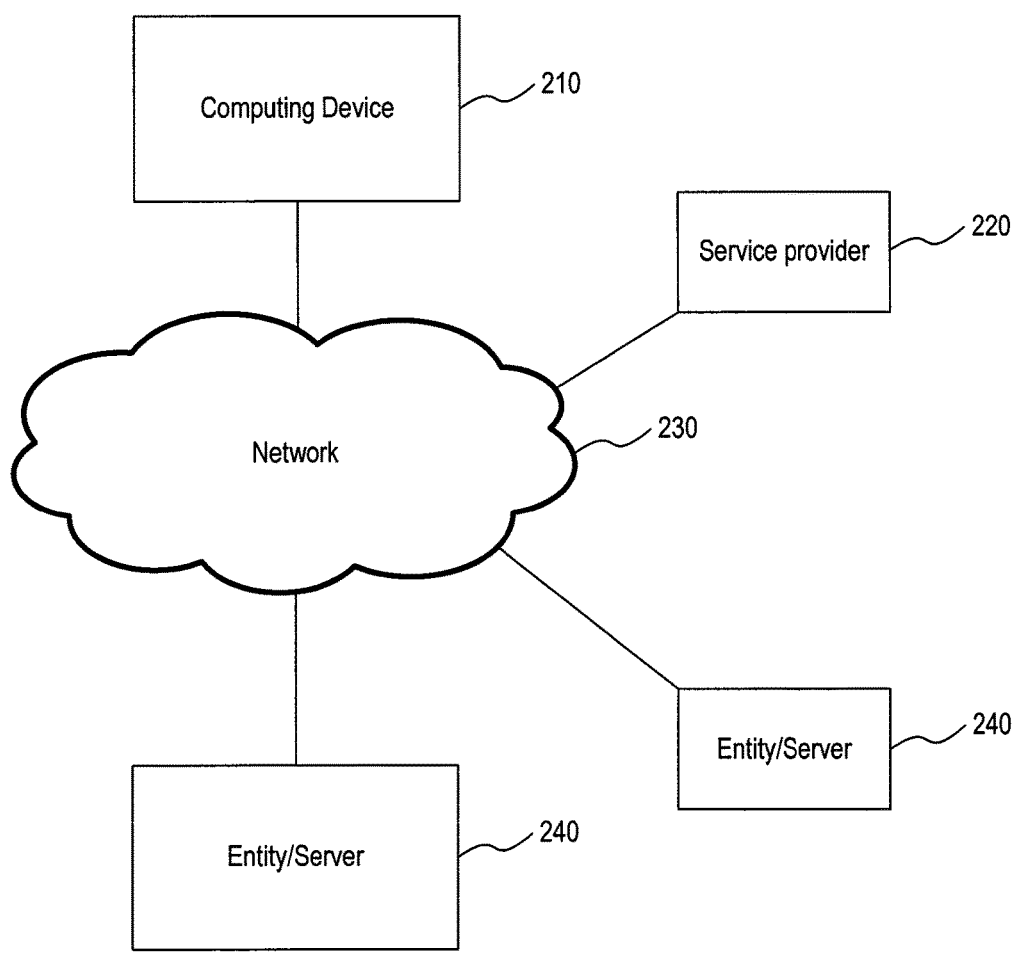
FIG. 2 illustrates a system for identifying availability of a good or a service, in accordance with at least some examples of the present disclosure.

FIG. 2 illustrates a system 200 for identifying an availability of a good or a service, or both, in accordance with at least some examples of the present disclosure. System 200 may include a computing device 210 coupled to a service provider 220 via a network 230. Service provider 220 may be further coupled to one or more entity servers 240 via network 230. Computing device 210 and network 230 may be substantially similar to computing device 110 and network 130, respectively. Moreover, each entity server 240 may be associated with an entity, such as a provider of goods, e.g., a store, a service provider, or any other type of entity.

A user of computing device 210 may transmit a request for a good or a service, or both, to service provider 220 via network 230. The term: "user," as used herein, may include designates or software applications, and is not limited to human individuals. In some examples, an individual may interact with an application on computing device 210 that may have rules for when to transmit and/or synchronize with a server or service provider 220. Service provider 220 may be configured to receive and to store the request for the good or the service, or both. The request for a good or a service may include a company brand name, a trademark, a good type, a good brand, a good name, a service type, a service brand, a service name, a sku, a barcode scan, or any combination thereof, and may include any other type of information describing a supplier, a good, and/or a service.

Service provider 220 may be configured to determine whether an entity, e.g., an entity located within a particular range of a location associated with computing device 210, has the requested good or the requested service, or both, available, and satisfies each criteria associated with the request. The criteria for the request may include any criteria described with respect to FIG. 1. In one example, service provider 220 may be configured to receive information, such as a good or a service list, from one or more entity server 240. The information or lists received from entity servers 240 may include one or more available goods or one or more available services associated with the entity. The available goods or available services may include a company brand name, a trademark, a good type, a good brand, a good name, a service type, a service brand, a service name, or any combination thereof, and may include any other type of information describing a supplier, good, or service. Service provider 220 may be configured to compare the available goods or the available services, or both, with the requested good or the requested service, or both, to identify a correlation therebetween. In response to identifying the correlation, service provider 220 may be configured to generate a message indicating the correlation. For example, such a message may indicate the availability of the requested good or the requested service, or both, and information identifying the entity associated with the available good or the available service, or both. The information or lists received from entity server 240 may be maintained by service provider 220 and may be regularly updated by entity server 240 via network 230, such daily or weekly.

In another example, service provider 220 may be configured to provide the requested good or the requested service to an entity server 240 associated with an entity that is located within the particular range of the location associated with computing device 110. Service provider 220 also may be configured to receive a message from the entity server 240 associated with the entity indicating the availability of the requested good or the requested service, or both. In response to receiving the message indicating the availability of the requested good or the requested service, or both, service provider 220 may be configured to generate a message indicating the availability of the requested good or the requested service, or both, and information identifying the entity associated with the available good or the available service, or both. In any of the above-described examples, service provider 220 may be configured to provide the message to computing device 210 via network 230. The message may indicate the availability of the good or the service, or both, and may include a name, an address, or directions to the entity associated with the available good or service, or any combination thereof. In some examples, the message may include a map illustrating computing device's 210 location and the location of the entity associated with the available good or the available service, or both.

In some examples, service provider 220 may include logic configured to adjust the location range associated with the request for an available good or service. For instance, service provider 220 may be configured to compare the requested goods or the requested services to available goods or available services associated with entities located outside of the range included in the request. In another example, the location range may be increased based on the request indicating a level of importance associated with the requested good or the requested service. In one example, service provider is configured to utilize the location and the direction of travel associated with the computing device 210, which may include data from a navigation system, a navigation application, an event calendar, an expectation based on past history, or any combination thereof, to identify areas that computing device 210 is expected to travel and to communicate with entity servers 240 for entities in the identified areas.

In another example, service provider 220 is configured to review consumer ratings for each entity identified as having an available good or an available service, or both, that correlates to the requested good or the requested service. Service provider 220 may be configured to provide the message indicating a name associated with the entity, an address associated with the entity, directions thereto, or any combination thereof, in the event the consumer ratings for the entity are above a particular threshold.

Figure 3:
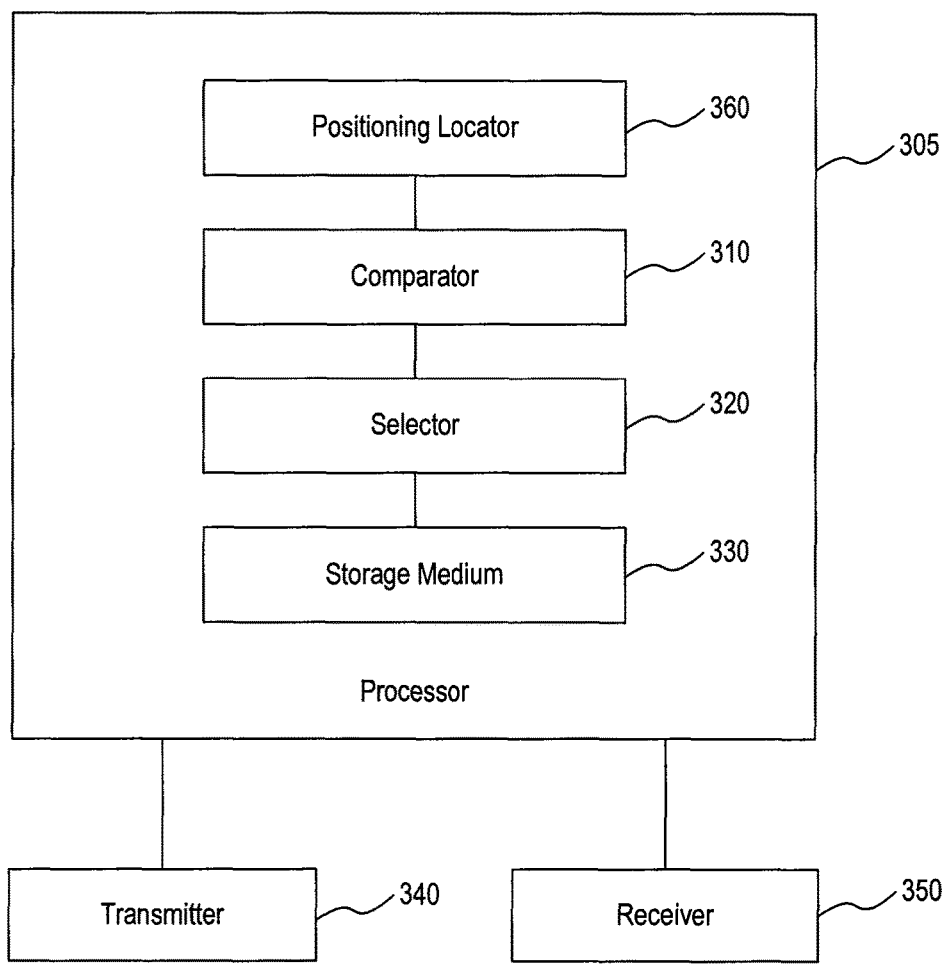
FIG. 3 is a block diagram illustrating an example system, in accordance with at least some examples of the present disclosure.

FIG. 3 is a block diagram illustrating an example system 300, in accordance with at least some examples of the present disclosure. System 300 may include a processor 305, a comparator 310, a selector 320, a storage medium 330, and a positioning locator 360. In the example illustrated in FIG. 3, comparator 310, selector 320, storage medium 330, and positioning locator 360 are on processor 305. However, any or all of these components may be separate from processor 305. Processor 305 may be coupled to a transmitter 340 and a receiver 350 to receive and to transmit signals via network 130. Storage medium 330 may be configured to store the reminders and/or the requested good or the requested service, or both, received from computing device 110. Storage medium 330 also may be configured to store good or service lists received from entity servers 240. Comparator 310 may be configured to compare the requested good or the requested service, or both, to the available goods or the available services indicated on the store good or service lists. Comparator 310 further may be configured to compare the one or more criteria in a reminder request to a location and/or a direction of travel associated with computing device 110, such as the direction of travel relative to a predetermined location. Selector 320 may be configured to select one of the reminder requests to be sent to computing device 110 in response to more criteria being satisfied. Selector 320 further may be configured to select one of the entities in response to the good or service list including an available good or an available service, or both, that correlates with the requested good or service. Transmitter 340 may be configured to provide, in response to the determination that there is a correlation, a message, indicating the correlation and identifying at least one entity associated with the correlation. Positioning locator 360 may be configured to identify a location, such as a range of location or an approximate location, associated with computing device 110, such as by the systems and methods discussed above.

In some examples, storage medium 330 may store program instructions that when implemented by processor 305 cause processor 305 to compare the requested good or the requested service, or both, to the available goods or available services, or both, indicated on the store good or service lists, to compare the one or more criteria in a reminder request to a location and a direction of travel associated with computing device 110, and to select one of the reminder requests to be sent to computing device 110 in the event of one or more criteria in a reminder request being satisfied. Service providers 120 and 220 and/or computing device 110 may include system 300.

Figure 4:
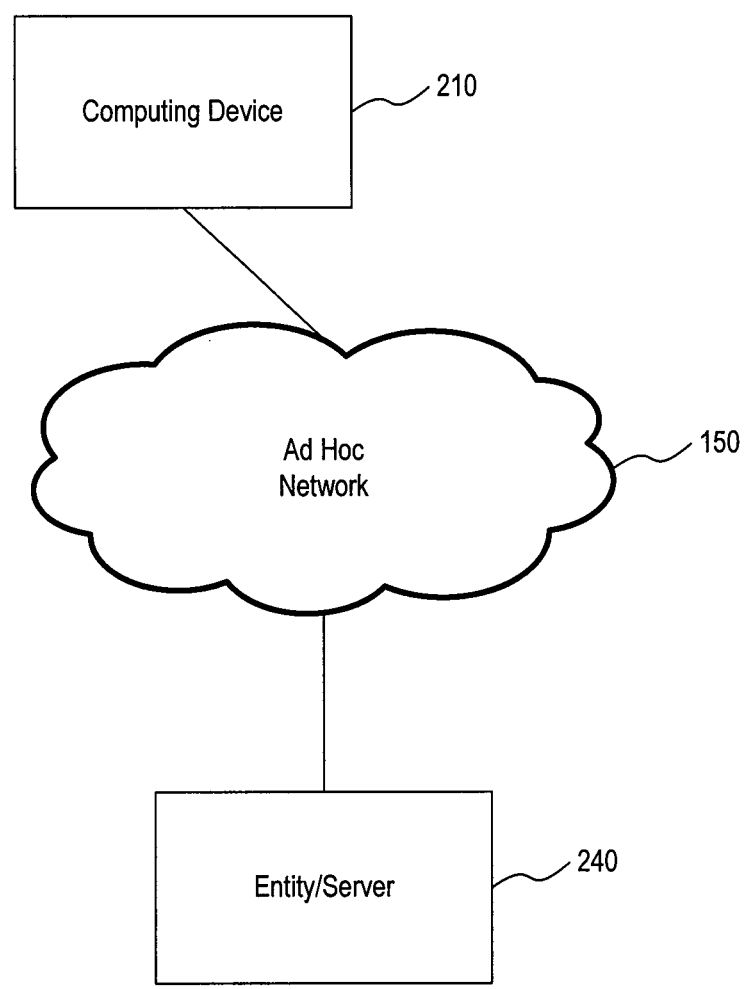
FIG. 4 illustrates another system for identifying availability of a good or a service, in accordance with at least some examples of the present disclosure.

FIG. 4 illustrates another system 400 for identifying availability of a good or service, in accordance with at least some examples of the present disclosure. System 400 may be substantially similar to system 200, except that computing device 210 is coupled to the one or more entity servers 240 via an ad hoc network 150. In one example, computing device 210 may be configured to automatically connect to entity servers 240 when computing device 210 comes into range of an ad hoc network 150. In another example, computing device 210 may have security controls implemented for connection to entity servers 240. For example, in one embodiment, only request/response pairs for the availability service may be allowed access to ad hoc network 150. In other examples, computing device 210 may be configured to request permission from a user of computing device 210 to connect to the ad hoc network 150. Upon computing device 210 being coupled to entity server 240, computing device 210 may upload one or more requested goods or requested services, or both, or alternatively, entity server 240 may download to computing device 210 a list of available goods or available services, or both. In the former case, entity server 240 may compare the requested good or requested service, or both, with the available goods or the available services, or both, corresponding to one or more entities. In the latter case, computing device 210 may compare the requested good or the requested service, or both, to the available goods or the available services, or both, on the list. In response to a correlation between the available goods or the available services, or both, and the requested goods or the requested services, or both, a message indicating the correlation may be provided to the user of computing device 210. In some examples, requested goods or services may be associated with a priority, and reminders for low-priority items may be suppressed when a power level of computing device 210 is below a predetermined power level or computing device 210 is operating in a power conservation mode. This may avoid the initiation of network traffic that may reduce available battery time of computing device 210. The priority associated with the requested goods or services may be user input or automatically may be determined.

In this example system 400, computing device 210 may not provide a location associated with computing device 210 to the entity server 240. Rather, the fact that computing device 210 is sufficiently close to ad hoc network 150 indicates that computing device 210 is within a range of entity server 240.

In one example, the entity that sells or offers the available good or the available service may be the same entity that maintains the entity server 240. In another example, entity server 240 may be maintained by one or more entities within a relatively close range, such as many stores in a mall.

In some examples, computing device 210 may include a feature that temporarily prevents service providers 120 and 220 from sending messages even in the event of a correlation between the requested good or the requested service, or both, and the available goods or the available services, or both.

Figure 5:
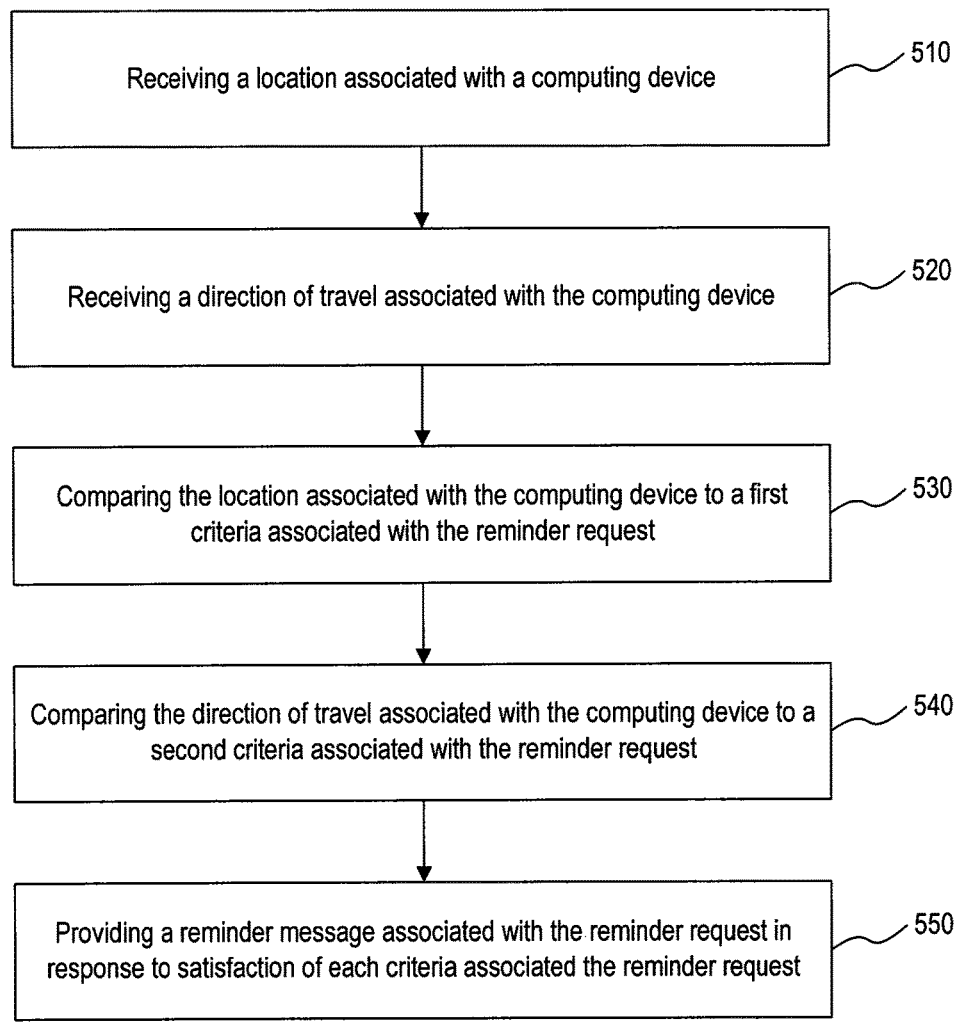
FIG. 5 is a flow chart illustrating an exemplary method, in accordance with at least some examples of the present disclosure.

FIG. 5 is a flow chart illustrating an exemplary method 500, in accordance with at least some examples of the present disclosure. Method 500 may include one or more functions, operations, or actions, as illustrated by blocks 510-550, for a computing device to provide a message. Method 500 may begin at block 510. In block 510, a first location associated with the computing device may be received. Block 510 may be followed by block 520. In block 520, a direction of travel associated with the computing device may be received. Block 520 may be followed by block 530. In block 530, the location associated with the computing device may be compared to a first criteria associated with a reminder request. Block 530 may be followed by block 540. In block 540, the direction of travel associated with the computing device may be compared to a second criteria associated with the reminder request. Block 540 may be followed by block 550. In block 550, a reminder message associated with the selected request may be provided in response to satisfaction of each criteria associated with the reminder request.

Figure 6:
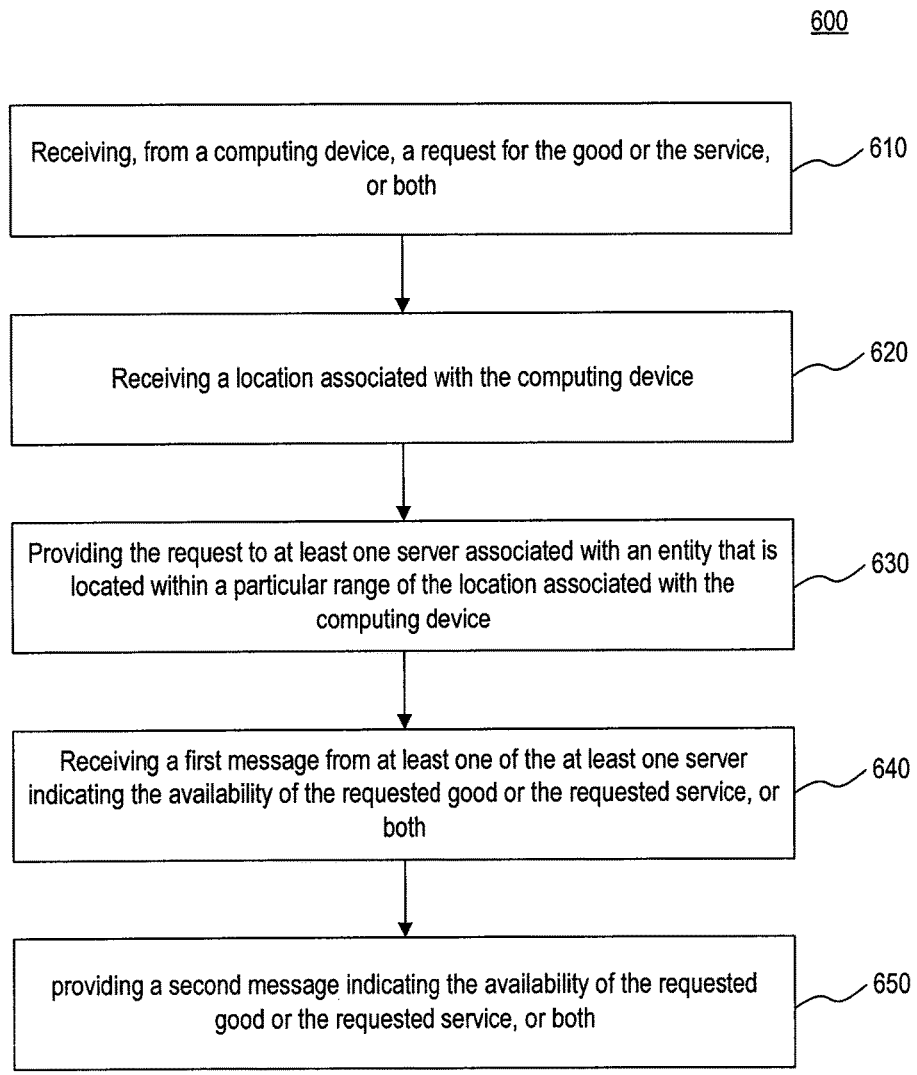
FIG. 6 is a flow chart illustrating another exemplary method, in accordance with at least some examples of the present disclosure.

FIG. 6 is a flow chart illustrating another exemplary method 600, in accordance with at least some examples of the present disclosure. Method 600 may include one or more functions, operations, or actions, as illustrated by blocks 610-650 for identifying availability of a good or a service, or both. Method 600 may begin at block 610. In block 610, a request for the good or the service, or both, may be received from a computing device. Block 610 may be followed by block 620. At block 620, a location associated with the computing device may be determined. Block 620 may be followed by block 630. In block 630, the request for the good or the service, or both, may be provided to at least one server associated with at least one entity that is located within a particular range of the location associated with the computing device. Block 630 may be followed by block 640. In block 640, a first message indicating availability of the requested good or the requested service, or both, may be received. Block 640 may be followed by block 650. In block 650, a second message indicating the availability of the requested good or the requested service, or both, may be provided to the computing device.

Figure 7:
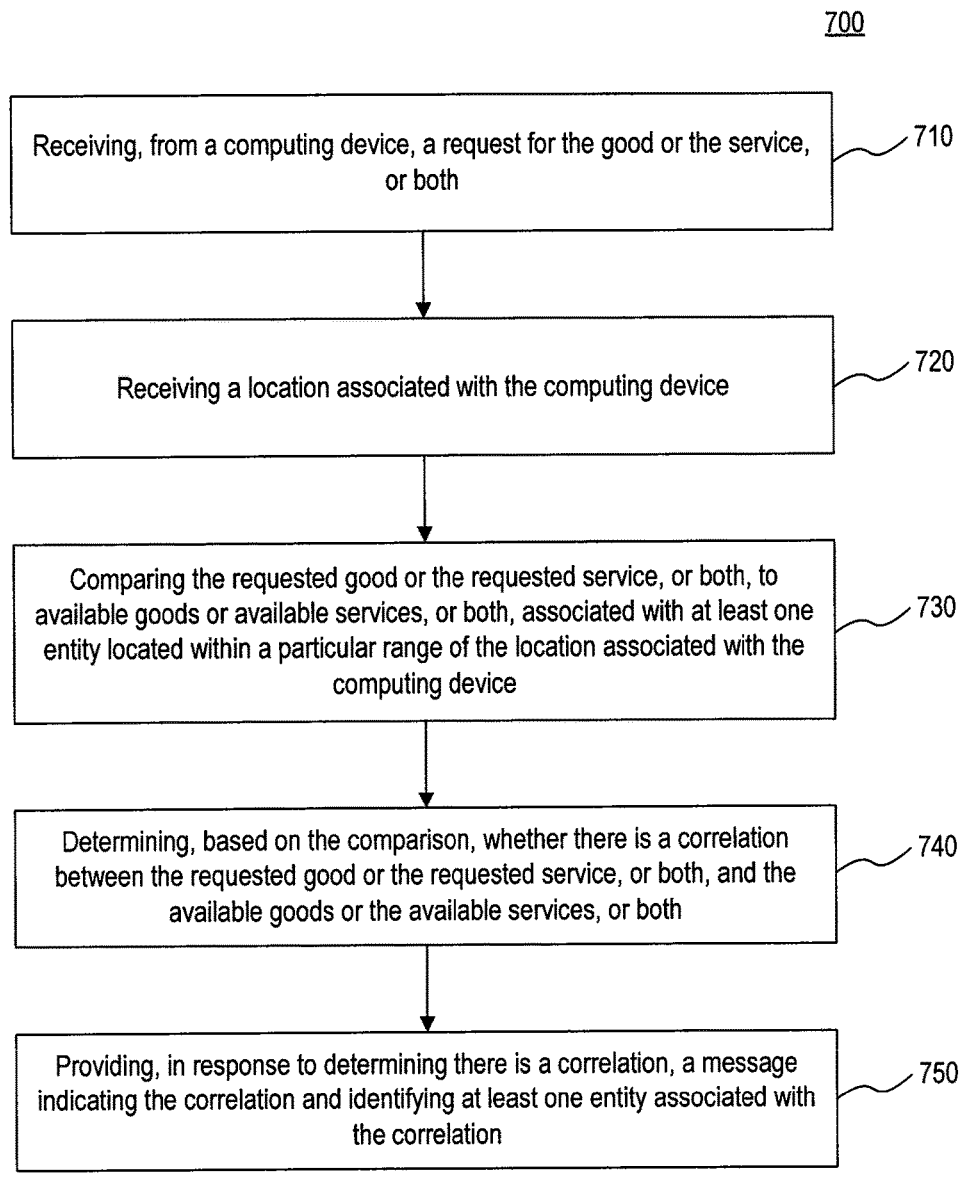
FIG. 7 is a flow chart illustrating yet another exemplary method, in accordance with at least some examples of the present disclosure.

FIG. 7 is a flow chart 700 illustrating yet another exemplary method 700, in accordance with at least some examples of the present disclosure. Method 700 may include one or more functions, operations, or actions, as illustrated by blocks 710-750 for identifying availability of a good or service. Method 700 may begin at block 710. In block 710, a request for the good or the service, or both, may be received from a computing device. Block 710 may be followed by block 720. In block 720, a location associated with the computing device may be determined. Block 720 may be followed by block 730. In block 730, the requested good or the requested service, or both, may be compared to available goods or available services from at least one entity located within a particular range of a location associated with the computing device. Block 730 may be followed by block 740. In block 740, a correlation between the requested good or the requested service, or both, and the available goods or the available service, or both, may be determined. Block 740 may be followed by block 750. In block 750, a message indicating the correlation and identifying at least one entity associated with the correlation may be provided.

Figure 8:
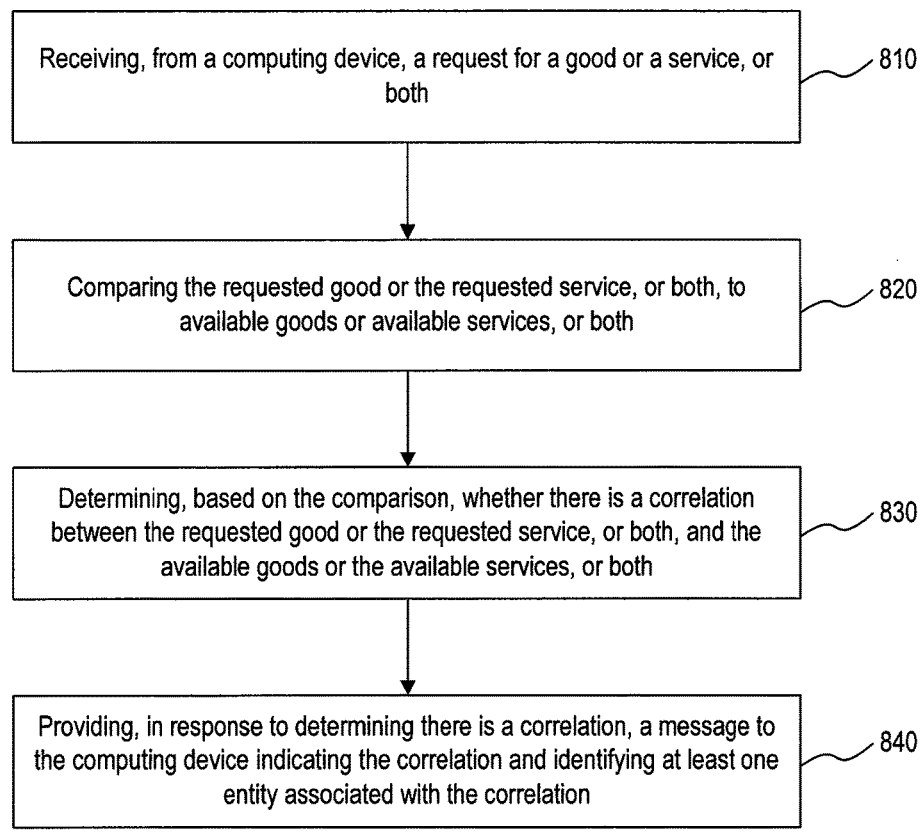
FIG. 8 is a flow chart illustrating yet another exemplary method, in accordance with at least some examples of the present disclosure.

FIG. 8 is a flow chart illustrating another exemplary method 800, in accordance with at least some examples of the present disclosure. Method 800 may include one or more functions, operations, or actions, as illustrated by blocks 810-840 for identifying availability of a good or a service. Method 800 may begin at block 810. In block 810, a request for the good or the service may be received from a computing device. Block 810 may be followed by block 820. At block 820, the requested good or the requested service, or both may be compared to available goods or available services, or both. Block 820 may be followed by block 830. In block 830, a correlation between the requested good or the requested service, or both, and the available goods or the available service, or both may be determined. Block 830 may be followed by block 840. In block 840, a message may be provided to the computing device indicating the correlation and identifying at least one entity associated with the correlation.

Figure 9:
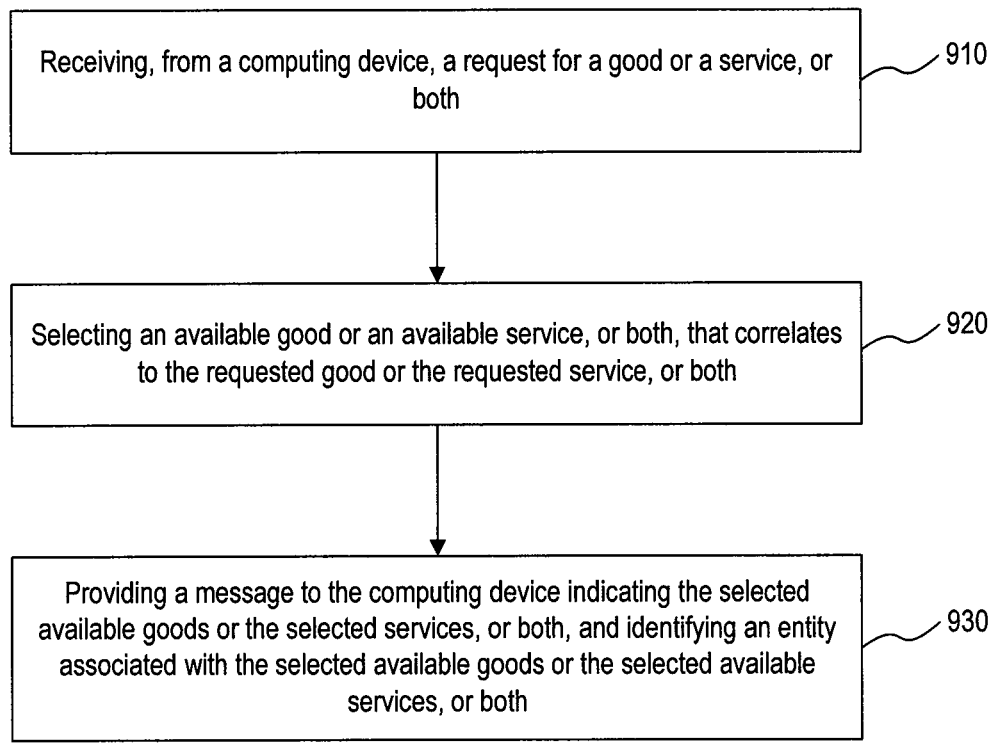
FIG. 9 is a flow chart illustrating yet another exemplary method, in accordance with at least some examples of the present disclosure.

FIG. 9 is a flow chart illustrating another exemplary method 900, in accordance with at least some examples of the present disclosure. Method 900 may include one or more functions, operations, or actions, as illustrated by blocks 910-930 for identifying availability of a good or a service, or both. Method 900 may begin at block 910. In block 910, a request for the good or the service, or both, may be received from a computing device. Block 910 may be followed by block 920. At block 920, an available good or an available service, or both, that correlates to the requested good or the requested service may be selected. Block 920 may be followed by block 930. In block 930, a message may be provided to the computing device indicating the selected available good or the selected service, or both.

The various blocks described herein for methods 500, 600, 700, 800, and 900 may be performed sequentially, in parallel, or in a different order than those described herein. It also should be appreciated that in some implementations one or more of the illustrated blocks may be eliminated, combined, or separated into additional blocks. The described and illustrated methods 500, 600, 700, 800, and 900 also may include various additional blocks not shown. For instance, in method 500, a first location associated with the computing device may be received at the same time as a direction of travel associated with the computing device is received.

While various examples have been disclosed herein, other examples will be apparent to those skilled in the art. The various examples disclosed herein are for purposes of illustration and are not intended to be limiting, with the true scope and spirit being indicated by the following claims.

What is claimed is:

1. A method comprising:
   identifying, by a computing device, data including path of travel information about one or more first paths taken by the computing device from a current location of the computing device to a particular destination;
   providing the path of travel information to a future location application configured to derive a path of travel based on a history of prior trips from a given geographic location, wherein the future location application comprises instructions executable by a local processor of the computing device or a remote processor;
   deriving, by the future location application, a second path based at least in part on the path of travel information;
   receiving, at the computing device from a server device, a list of available goods or available services or both from at least one entity based at least in part on the second path;
   generating, using the computing device, a visualization of the available goods or the available services or both based at least in part on the list; and
   displaying, using the computing device, the visualization of the available goods or the available services or both.

2. The method of claim 1, wherein the second path is derived based at least in part on a current time or current day.

3. The method of claim 1, further comprising:
   generating, using the computing device, an identification of a particular good or a particular service, or both;
   wherein the identification of the particular good or service, or both, includes at least one criterion associated with the particular good or the particular service, or both, the at least one criterion including an identification of a class or category of stores, a class or category of services, a trademark, a brand name, a store brand name, a service brand name, a predetermined destination, a predetermined location, a predetermined distance from a location, or a time of day, availability of network connection, or a combination thereof.

4. The method of claim 3, further comprising:
   generating, using the computing device, a request for a reminder including the identification of the particular good or service, or both; and
   transmitting, using the computing device, the request for the reminder from the computing device to the server device.

5. The method of claim 4, further comprising:
   receiving, at the computing device from the server device, a reminder including the list of the available goods or the available services or both based at least in part on the request for the reminder;
   generating, using the computing device, a visualization of the reminder; and
   displaying, using the computing device, the visualization of the reminder in response to being in geographic proximity to the particular destination along the second path.

6. The method of claim 4, wherein the identification of the particular good or service, or both, includes a priority level corresponding to the particular good or the particular service or both;
   determining a power level of the computing device; and
   suppressing the display of the visualization of the reminder on the computing device based at least in part on the power level.

7. A mobile device, comprising:
   a memory device having instructions stored thereon; and
   a processing device to execute the instructions stored in the memory device to:
     compute a geographic location of the mobile device;
     identify path of travel information about one or more first paths taken by the mobile device from the computed geographic location;
     following computation of the geographic location of the mobile device, provide the path of travel information to a future location application configured to derive a path of travel based on a history of prior trips from a given geographic location, wherein the future location application comprises instructions executable by the processing device or a remote processing device;

wherein said providing the path of travel information to the future location application causes the future location application to derive a second path based on the path of travel information, and wherein the processor device executes the instructions stored in the memory device further to:

receive a list of available goods or available services from at least one server device corresponding to at least one entity based at least in part on the second path;

generate a visualization of the list of available goods or available services; and display the visualization.

8. The mobile device of claim 7, wherein
the second path is derived based at least in part on a day of a week or a time of the day.

9. The mobile device of claim 7, wherein the processing device executes the instructions stored in the memory device further to:

generate an identification of a particular good or a particular service, or both, wherein the identification of the particular good or the particular service, or both, includes at least one criterion associated with the particular good or the particular service, the at least one criterion including an identification of a class or category of stores, a class or category of services, a trademark, a brand name, a store brand name, a service brand name, a predetermined destination, a predetermined location, a predetermined distance from a location, or a time of day, availability of network connection, or a combination thereof; and generate a request for a reminder including the identification of the particular good or the particular service, or both.

10. The mobile device of claim 9, wherein the processing device executes the instructions stored in the memory device further to:

generate a reminder based at least in part on the request for the reminder;

generate a visualization of the reminder; and display the visualization of the reminder based on a correlation between the geographic location of the mobile device and the predetermined location.

11. The mobile device of claim 7, wherein the processing device executes the instructions stored in the memory device further to:

include a priority corresponding to the particular good or the particular service;

determine a power level of the mobile device; and suppress the display of the visualization on the mobile device based at least in part on the power level.

12. An electronic memory storing instructions, which upon execution by a processing device, causes the processing device to perform operations comprising:

compute a geographic location of a mobile device;

identify path of travel information about one or more first paths taken by the mobile device from the computing geographic location;

following computation of the geographic location of the mobile device, provide the path of travel information to a future location application configured to derive a second path based on a history of prior trips from a given geographic location, wherein the future location application comprises instructions executable by the processing device or a remote processing device, wherein said providing the path of travel information to the future location application causes the future location application to derive a second path based on the path of travel information;

receive a list of available goods or available services from at least one server device corresponding to at least one entity geographically located along the first;

generate a visualization of the list of available goods or the available services; and cause display the visualization on the mobile device.

13. The electronic memory of claim 12, wherein
the second path is derived based at least in part on a day of a week or a time of the day.

14. The electronic memory of claim 12, wherein the instructions, upon execution by the processing device, cause the processing device to perform operations further comprising:

generate an identification of a particular good or a particular service, or both, wherein the identification of the particular good or the particular service, or both, includes at least one criterion associated with the particular good or the particular service, the at least one criterion including an identification of a class or category of stores, a class or category of services, a trademark, a brand name, a store brand name, a service brand name, a predetermined destination, a predetermined location, a predetermined distance from a location, or a time of day, availability of network connection, or a combination thereof; and generate a request for a reminder including the identification of the particular good or the particular service, or both.

15. The electronic memory of claim 14, wherein the instructions, upon execution by the processing device, cause the processing device to perform operations further comprising:

generate the reminder including the list of the available goods or the available services based at least in part on the request for the reminder;

generate a visualization of the reminder; and cause display the visualization of the reminder on the mobile device based at least in part on a correlation between the request for the reminder and the at least one criterion.

16. The electronic memory of claim 12, wherein the instructions, upon execution by the processing device, cause the processing device to perform operations further comprising:

identify a priority corresponding to each of the particular good or the particular service;

determine a power level of the mobile device; and suppress display of the visualization on the mobile device based at least in part on a correlation of the power level and the priority.

* * * * *